United States Patent [19]

Henderson

[11] Patent Number: 4,951,743

[45] Date of Patent: Aug. 28, 1990

[54] ENVIRONMENTAL LEAKAGE PROTECTOR FOR RECIROCATING ROD FLUID DISPLACEMENT ARRANGEMENTS

[76] Inventor: Tom Henderson, 301 E. Kern St., Taft, Calif. 93268-0253

[21] Appl. No.: 426,568

[22] Filed: Oct. 25, 1989

[51] Int. Cl.⁵ .................. F21B 33/08; F16J 15/18; F16J 15/52

[52] U.S. Cl. ........................... 166/84; 74/18.2; 166/66; 277/19

[58] Field of Search ............. 166/84, 81, 82, 66, 166/53, 113, 83; 277/17-20, 30, 31; 74/18.2

[56] References Cited

U.S. PATENT DOCUMENTS

| | | | |
|---|---|---|---|
| 1,960,927 | 5/1934 | Siegert | 277/19 |
| 3,186,722 | 6/1965 | Johnston | 166/84 X |
| 3,270,810 | 9/1966 | Johnston | 166/84 |
| 3,276,246 | 10/1966 | Truman et al. | 73/40.5 R |
| 3,322,198 | 5/1967 | McHenry | 166/81 |
| 3,353,606 | 11/1967 | Dyer | 166/84 |
| 3,468,374 | 9/1969 | Reeves | 166/84 |
| 3,953,037 | 4/1976 | Winfield, Jr. | 74/18.2 X |
| 4,017,214 | 4/1977 | Smith | 277/19 X |
| 4,530,397 | 7/1985 | Calhoun | 166/84 |
| 4,556,369 | 12/1985 | Braun | 74/18.2 X |
| 4,647,050 | 3/1987 | Johnson | 166/84 X |
| 4,665,976 | 5/1987 | Retherford | 166/84 X |
| 4,872,508 | 10/1989 | Gordon | 166/84 |

Primary Examiner—Stephen J. Novosad
Attorney, Agent, or Firm—Sixbey, Friedman, Leedom & Ferguson

[57] ABSTRACT

A leakage protector for preventing gases, vapors and liquids emanating as leakage through the seals or packings around the reciprocating rod of reciprocating rod-type fluid displacement arrangements, such as those of pumps, compressors, and the like from reaching the surrounding environment. The leakage protector has an adaptor for mounting a leakage recovery unit of the protector on the casing of the reciprocating rod arrangement in proximity to its packing or seal. The reciprocating rod passes through the leakage recovery unit with clearance, and a bellows component is sealingly attached to the reciprocating rod at one end and to the leakage recovery unit at an opposite end. The interior of the bellows component is able to communicate with the interior of the recovery unit, and the leakage recovery unit is connected to a vacuum recovery line via a vacuum recovery fitting having a valve which causes the vacuum recovery line to be sealed relative to the interior of the leakage recovery unit except when pressure increases occur within the interior of the leakage recovery unit due to the entry of leakage. A fluid sensor can also be provided to shut down operation of the reciprocating rod arrangement, should excessive leakage occur.

17 Claims, 5 Drawing Sheets

ENVIRONMENTAL LEAKAGE PROTECTOR FOR RECIROCATING ROD FLUID DISPLACEMENT ARRANGEMENTS

BACKGROUND OF THE INVENTION

1. Field of the Invention

The present invention relates to protecting the environment from waste gases and fluids produced by leakage in reciprocating rod-type fluid displacement arrangements such as those of pumps, compressors, and other devices where the potential exists for leakage of a gas or liquid about a rod which reciprocates through a casing, pipe, housing, or the like.

2. Description of Related Art

Reciprocating rod arrangements are commonly utilized in connection with such devices as pumps and compressors acting on toxic gases and liquids; for example, oil well pumping units, where a packing gland system or other form of seal or packing is utilized to prevent leakage from passing out of the arrangement from around the reciprocating rod. However, no matter how effective a seal or packing arrangement may be when new, ultimately wear on the packing or seal occurs due to the reciprocating action of the rod through the packing or seal, and with wear, leakage of vapors and/or liquids through the packing or seal occurs. Furthermore, while the extent of leakage may not be sufficient to cause shutting down of the equipment to replace the seal or packing due to the associated reduction in production or the potential for damage to the associated equipment, even small amounts of vapor and liquid leakage into the surrounding environment creates a measurable amount of pollution and a potential hazard, especially where the device is utilized within a building.

In the case of wells that are located in metropolitan areas or offshore, environment concerns are particularly acute, so that frequent servicing of the packing or seal around the reciprocating rod becomes necessary to prevent leakage that would, otherwise, be considered inconsequential from an operational or economic standpoint. Thus, while it is known to provide stuffing boxes with leakage detectors (see Truman, et al. U.S. Patent No. 3,276,246), such arrangements merely serve to terminate operation once excessive leakage occurs, and do not deal with the problem of leakage occurring under circumstances where, but for environmental/safety concerns, there is no need to terminate operation.

In U.S. Patent No. 4,530,397 to Calhoun, an oil saving apparatus for use with a well pump polish rod is disclosed for conserving oil which may leak from the stuffing box of an oil well pump polish rod by passing along the polish rod when the stuffing box packing wears or dries out. In accordance with this patent, a housing is welded onto the top of a conventional stuffing box of a well head fitting. The housing contains an auxiliary packing, a fluid leakage collection chamber and discharge ducts. Fluid leakage collected by the collection chamber and leakage fluid which may pass through the collection chamber into the auxiliary packing are drained by the discharge ducts into a collection receptacle. While such an apparatus may conserve an amount of oil that would otherwise be lost due to leakage, since the auxiliary packing will be as prone to wear as the conventional packing of the stuffing box of the well head, this apparatus will not effectively deal with the problem of protecting the environment from waste and other toxic gases passing out along the shaft into the environment, nor will it totally eliminate the leakage of fluid into the environment.

Johnston U.S. Patent No. 3,270,810 reflects the need to prevent damage to vegetation and property adjacent a well due to the discharge of oil, salt water, and gas into the environment, but only to the extent that such may be sprayed into the atmosphere and carried by the winds over a large area due to a "blowout," i.e., an essentially total failure of the seal. The polish rod protector and blow deflector of Johnston is comprised of a bonnet into which any blowby oil or water which may occur due to failure of the stuffing box will be collected and conveyed, via a discharge conduit, to the earth immediately adjacent the well, rather than sprayed over surrounding vegetation and into the atmosphere. Furthermore, a bellows is affixed to the top of the bonnet and is clamped to the polish rod so as to cause the bellows to communicate with the interior of the bonnet and to expand and contract with reciprocation of the polish rod. The bellows serves the purpose of protecting the polish rod from blowing dust and dirt, and results in air breathing in and out of the bonnet, via the discharge conduit, as the bellows is reciprocated up and down with the polish rod.

Thus, on the one hand, the presence of a discharge conduit makes the Johnston device incapable of achieving the current demand for increased environmental protection; and, on the other hand, if the discharge conduit were merely to be eliminated, air would no longer be able to breathe in and out of the bonnet, so that extension of the bellows would produce a suction effect that would increase the tendency for gas and oil to leak past the packings, and there would be no means to vent the bonnet of accumulated gases and liquids which are collected in it.

A safety hood apparatus for drilling heads is disclosed in McHenry U.S. Patent No. 3,322,198 which is designed for enclosing rotating assemblies, such as blowout preventers and strippers of oil well drilling rigs to exhaust or remove leakage materials emanating from them. The lower portion of the hood is securely fastened to the lower section of a rotating head directly above the flow line, while the upper portion of the hood extends above the exposed portion of the rotating assembly drive bushings or rings and has a hole diameter at that point sufficient to permit withdrawal of the preventer and stripper from the hood without removing the hood. Furthermore, a suction pump is coupled to the hood and flow line, via a suitable conduit, to withdraw any dispersals or suspensions of gas, air, dust cuttings, and so forth, from the atmosphere confined by the hood, as a result of leakage about the stripper, bonnet, or other parts of the rotating assembly, and so as to exhaust such materials to the flow line or overflow outlet. To ensure proper operation of the pump, the hole in the upper portion of the hood does not form a tight seal and operates to allow sufficient air to flow into the hood, which results in a slight positive pressure being maintained inwardly of the hood at its upper portion.

However, the safety hood apparatus of McHenry is not suitable for use in reciprocating rod fluid displacement arrangements. Furthermore, on the one hand, if an inadequate level of vacuum is not maintained within the hood, the portions at which air is able to flow into the hood can serve as sites at which leakage gases and liquids can escape, while, on the other hand, if a relatively high vacuum is maintained within the hood, the vacuum drawn by the pump will undesirably foster leakage.

Thus, there is still a need for an environmental leakage protector for reciprocating rod fluid displacement arrangements, such as pumps, pumping units, and compressors, which will effectively protect the environment from gases and liquids produced by leakage and reciprocating rod action devices without affecting operation or increasing the propensity toward leakage.

SUMMARY OF THE INVENTION

In view of the foregoing, it is a primary object of the present invention to provide an environmental leakage protector for reciprocating rod displacement arrangements which will contain any leakage and channel it to a proper recovery system while causing no effect on the normal rod action or the propensity of leakage to escape past the rod seals or packings.

It is a further object of the present invention to provide an environmental leakage protector for reciprocating rod fluid displacement arrangements which will automatically shut down the unit in the event of a major leak in the packing or seal area, so that any spillage is contained and not discharged into the atmosphere.

It is still a further object of the present invention to provide an environmental leakage protector that will be simple in construction, yet applicable to a wide range of devices and units having reciprocating rod fluid displacement arrangements as a part thereof.

These objects are achieved in accordance with the preferred embodiments of the present invention through the use of a leakage protector which is comprised of a leakage recovery unit having an adaptor for mounting a leakage recovery unit of the protector on the casing of the reciprocating rod arrangement in proximity to its packing or seal. The reciprocating rod passes through the leakage recovery unit with clearance, and a bellows component is sealingly attached to the reciprocating rod at one end and to the leakage recovery unit at an opposite end. The interior of the bellows component is able to communicate with the interior of the recovery unit, and the leakage recovery unit is connected to a vacuum recovery line via a vapor recovery fitting, and the recovery component also contains a fluid sensor.

Under normal conditions of operation, the vacuum recovery line is sealed relative to the interior of the leakage recovery unit by a valve of the recovery fitting. However, in the event that a leak should occur, a pressure increase will result which, when the bellows contract, will cause the recovery fitting to open, thereby allowing the vacuum, in the vacuum recovery line, to draw out gases and liquids from the leakage recovery unit. In the event that an excessive amount of liquid enters into the leakage recovery unit, the fluid sensor will shut down operation of the reciprocating rod arrangement.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
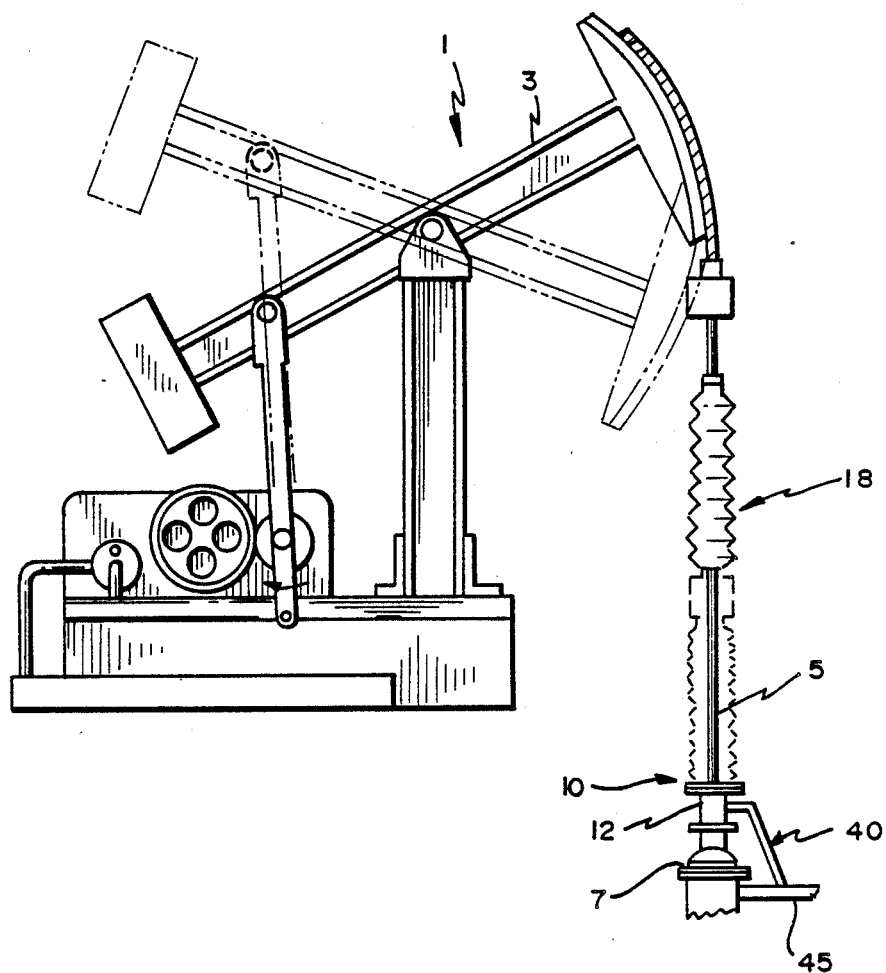
FIG. 1 illustrates an oil well pumping unit equipped with a leakage protector in accordance with the present invention.

In FIG. 1, a reciprocating rod arrangement in the form of a well pumping unit 1, of the well-known horse head type, is shown. In such an arrangement, rocking of a horse head beam 3 produces an up-and-down movement of a reciprocating rod 5, known as a polish rod, in and out of a well head casing 7 through a seal means in the form of a packing gland within a so-called stuffing box, as is also conventional. FIG. 1 also shows an environmental leakage protector, designated generally by the reference numeral 10, for preventing gases and liquids that may leak past the packing gland of the stuffing box between the reciprocating rod and the casing wall from reaching the surrounding environment. As shown in FIG. 1, this leakage protector 10 is provided about the reciprocating rod 5 in proximity to the seal means within the stuffing box of the well head casing 7.

The leakage protector 10 is comprised of four basic components, two of which remain fixed with respect to the casing 7, and two of which follow the reciprocation of the rod 5. The stationary components will now be described relative to FIG. 2.

Figure 2:
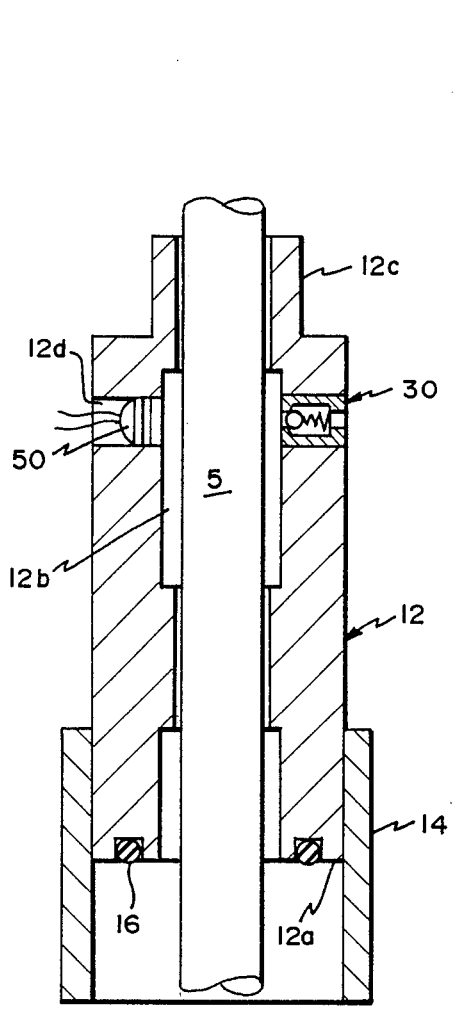
FIG. 2 illustrates a first embodiment of a leakage recovery unit of the leakage protector of FIG. 1, in conjunction with a polish rod.

In particular, FIG. 2 illustrates a leakage recovery unit which is mounted upon a casing wall forming an end of the reciprocating rod arrangement in proximity to the seal means thereof (e.g., on top of the stuffing box wall through which the reciprocating rod passes, as shown in FIG. 1) by means of an adaptor 14. Adaptor 14 may be a ring clamp which grips both the casing wall and recovery unit 12, a cylindrical member that is bolted or welded to the recovery unit and/or casing (note bolt holes 14'a and weld 14'b, FIG. 3) or the like, depending upon the particular construction of the reciprocating rod arrangement. Furthermore, while the adaptor 14 has been shown as a simple cylindrical member for purposes of illustration, it could be given a perimetric securement flange for fastening to the casing wall (see FIG. 8), or any other shape conducive to mounting of the recovering unit 12 to the particular casing wall of the particular reciprocating rod arrangement. Furthermore, to prevent leakage between the casing wall and the end of the recovery unit seated thereagainst, an O-ring seal 16 is seated in the end face 12a of recovery unit 12.

Recovery unit 12 is provided with a hollow interior for enabling the reciprocating rod 5 to pass through it with clearance, as well as to provide a path for leakage fluids, such as oil, gas, and steam. The hollow interior 12b can be in the form of a series of chambers (FIG. 2), or can be of a uniform diameter (see interior 12'b, FIG. 3) for this purpose.

At the opposite end of recovery unit 12 from end face 12a is a bellows seat 12c upon which an end of a bellows component 18 is seated and secured in an airtight fashion via a ring clamp, force fit, or the like. Bellows component 18 may be comprised of one or more bellows 20, each of which has a cylindrical array of accordian folds 20a and a pair of mounting sleeve portions 20b. The bellows is mounted to the recovery unit 12 by one of the mounting sleeves 20b, as already described, and by the other, to the reciprocating shaft 5, as will now be explained.

For causing the bellows 20 to expand and contract with reciprocation of the rod 5, a bellows mount 22 is secured on the reciprocating rod 5 via, for example, a plurality of set screws 24. The bellows mount 22 has a bellows seating portion over which a bellows sleeve portion 20b is secured in an airtight manner, such as by a ring clamp (not shown). Furthermore, in order to ensure that gases cannot escape from the bellows through the junction of the bellows mount 22 and the reciprocating rod 5, an O-ring 26 is positioned within a recess of the through passage for the rod 5, so as to sealingly engage against the rod when the bellows mount 22 is fixed thereon. The bellows can be formed of any sufficiently flexible material which is chemically resistant to the leakage fluids to which it will be exposed, stainless and specialty steels being preferred for high pressure applications.

Figure 4:
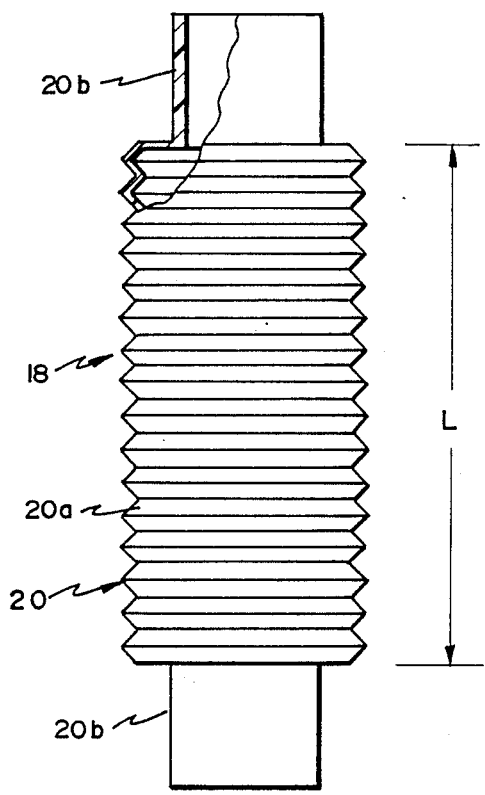
FIG. 4 is a partially broken away elevational view of a bellows for use in a leakage protector in accordance with the present invention.
Figure 5:
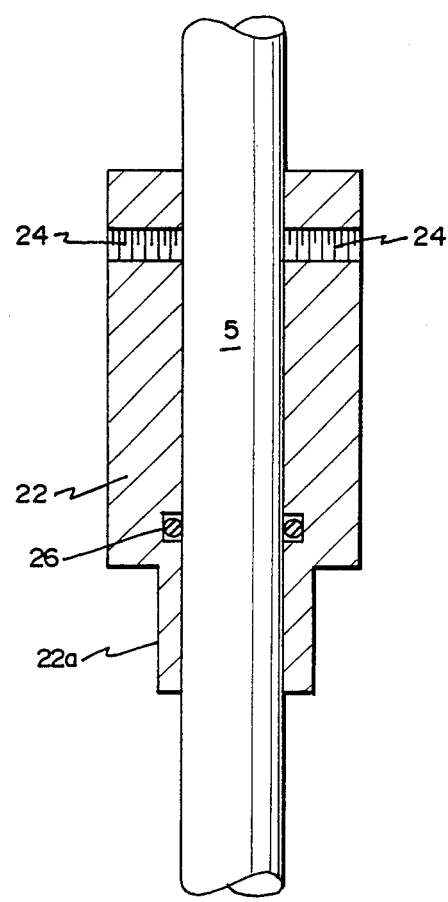
FIG. 5 is a bellows mount for securing an end of a bellows to a reciprocating rod; the bellows mount being shown in cross-section upon a reciprocating rod.
Figure 6:
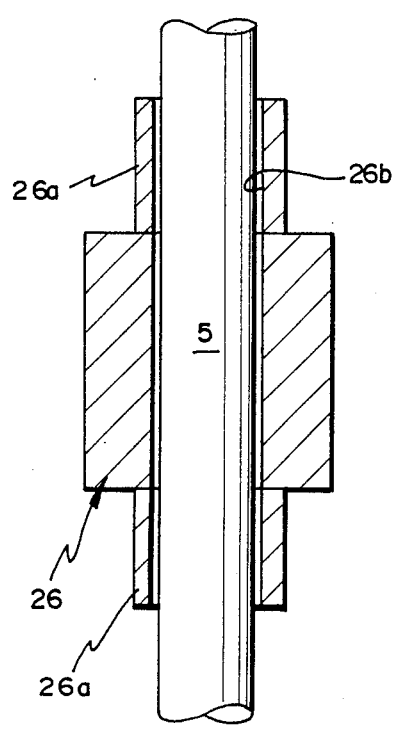
FIG. 6 is a cross-sectional view of a bellows connector disposed upon a polish rod for interconnecting a pair of bellows in a floating fashion.

The position of the bellows mount is set at a distance from the bellows sleeve portion 12c of the leakage recovery unit 12 that corresponds to at least the stroke length of the reciprocating rod 5, and is coordinated to the length of the bellows component 18 so that, when the rod is maximally retracted (solid line position, FIG. 1), the bellows 20 will be, preferably, extended to 90% of its fully extended length. However, beyond a certain bellows length L (FIG. 4), which is a function of the diameter and material of which the bellows is composed, there is a tendency for bellows to deform so as to deflect against one side of the rod as it is compressed, thereby causing the rod to rub against and ultimately damage the bellows. For this reason, in environments where the stroke length of the reciprocating rod will cause such a bellows deformation problem, if a single long bellows is used, a bellows component 18 is utilized which is formed of a plurality of bellows 20, with each pair of bellows 20 being connected by a floating bellows connector 26.

The floating bellows connector 26 has a pair of bellows mounting seat portions 26a, upon which a respective bellows mounting sleeve portion 20b will be clamped in an airtight fashion. Furthermore, in order to permit the bellows to expand and contract jointly, as well as to enable gases and vapors to be collected in each bellows, the floating bellows connector has a through passage 26b which is sufficiently oversized relative to the diameter of the reciprocating rod 5 to enable free movement thereof over the rod 5, as well as free communication between the pair of bellows connected thereby.

Inasmuch as the above-described leakage protector 10 forms an airtight enclosure upon the well head casing 7, in order to prevent the bellows component from creating a vacuum that would act to increase leakage through the stuffing box, the leakage protector 10 should be installed with the reciprocating rod 5 when the rod is in its retracted position. On the other hand, to prevent damage to the bellows due to increased pressures associated with leakage fluids being accumulated within the hollow interior 12b of the recovery unit and leakage gases and vapors accumulated within the bellows, the leakage recovery unit 12 is provided with a leakage recovery fitting 30 by which the hollow interior 12b of the leakage recovery unit 12 can be communicated with a vacuum recovery line 40, but only in the event of a leakage produced pressure buildup within space 12b. Vacuum can be applied to the vacuum recovery line 40 via a standard gas gathering line or a compressor which, in turn, puts the recovered fluids into, for example, a product line 45 from the well casing 7.

Figure 7:
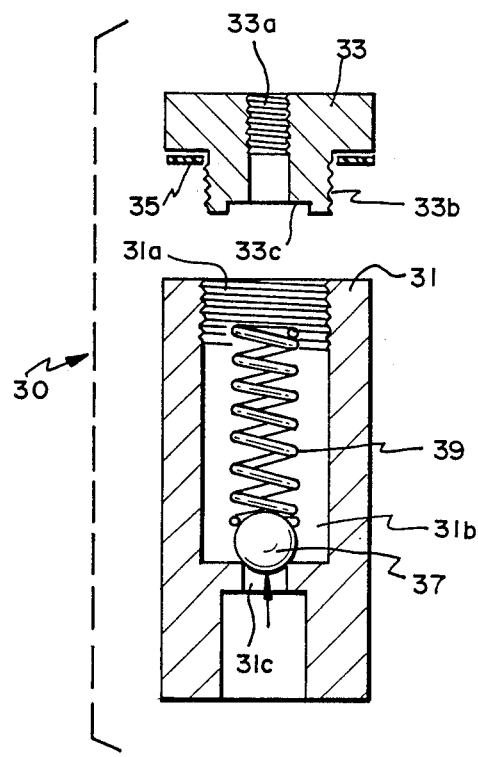
FIG. 7 is an exploded cross-sectional view of a recovery fitting for use in the leakage recovery units of FIGS. 2 or 3.

A preferred embodiment of a simple, adjustable vacuum responsive recovery fitting 30 of a check valve type is illustrated in FIG. 7. This fitting 30 can be either press fit or threaded into one of a pair of radial bores 12d that extend through the leakage recovery unit from hollow interior 12b to the exterior. The illustrated embodiment for recovery fitting 30 is comprised of a body 31 and a closure 33. The closure 33 is provided with an internally threaded vacuum port 33a for attachment of vacuum recovery line 40 to fitting 30. Cover 33 is also provided with an external threading by which it can be threaded into a matching internal threading 31a of a valve chamber 31b formed in the body 31, a gasket 35 being provided to ensure that an airtight sealing of the recovery fitting is obtained.

A ball valve member 37 is biased into a position closing a valve port 31c via a spring 39 that is prestressed by engagement against a spring seat 33c of the closure 33, when closure 33 is threaded into chamber 31b. By selecting a spring having a suitable spring constant, flow from the hollow interior of the leakage recovery unit 12 to the vacuum recovery line 40 will be blocked by the valve member 37 below a predetermined positive pressure and will be permitted, by unseating of the ball valve member 37 against the biasing force of spring 39, when the pressure within the hollow interior 12b of the vacuum recovery unit 12 is above that predetermined positive pressure. In this regard, the value of spring 39 should be selected so that under normal operating conditions, when no leakage is escaping between the reciprocating rod and the casing wall through which it passes into the recovery unit 12, a positive pressure will be maintained in the hollow interior 12b during both contraction and expansion of the bellows component 18. On the other hand, the spring constant should be low enough so that, when the pressure within the recovery unit 12 builds up due to the presence of leakage fluids within its hollow interior, the ball valve member 37 will become unseated to allow excess pressure to be sucked out by the vacuum line 40, thereby preventing damage to the bellows component 18.

Furthermore, it is also desirable to enable the prime mover of the reciprocating rod arrangement to be shut down to stop the reciprocating action of the rod when excessive leakage of fluid occurs, but before total failure of the seal. In this way, in a static condition, the leaking packing, normally, will be able to hold back the pressure and fluid until remedial action can be taken. To this end, a liquid level switch 50 can be inserted into the second radial bore 12d. Numerous commercially available products will be suitable for this purpose. For example, the Robertshaw Controls Company produces a Model 741 probe that can be used in conjunction with Robertshaw's Model 304B electronic, capacitance-actuated on-off control instrument for detecting the liquid level within the recovery unit 12 as a function of capacitance changes, and for providing an output capable of driving an electromechanical control relay circuit when the detected value exceeds a reference value. Of course, numerous other equivalent devices will be known to those of ordinary skill in the art and the use of any particular type of level sensor, per se, forms no part of this invention.

While the above description of the features of the leakage protector in accordance with the present invention will be recognized as providing a simple and effective means for completely eliminating the escape of vapors, gases, and liquids emanating from worn packings and seals around reciprocating rods in a reciprocating rod arrangement, it should also be recognized that only some exemplary forms for preferred embodiments have been mentioned for one particular type of application, the invention being adaptable to meet the requirements of any reciprocating rod arrangement.

Figure 3:
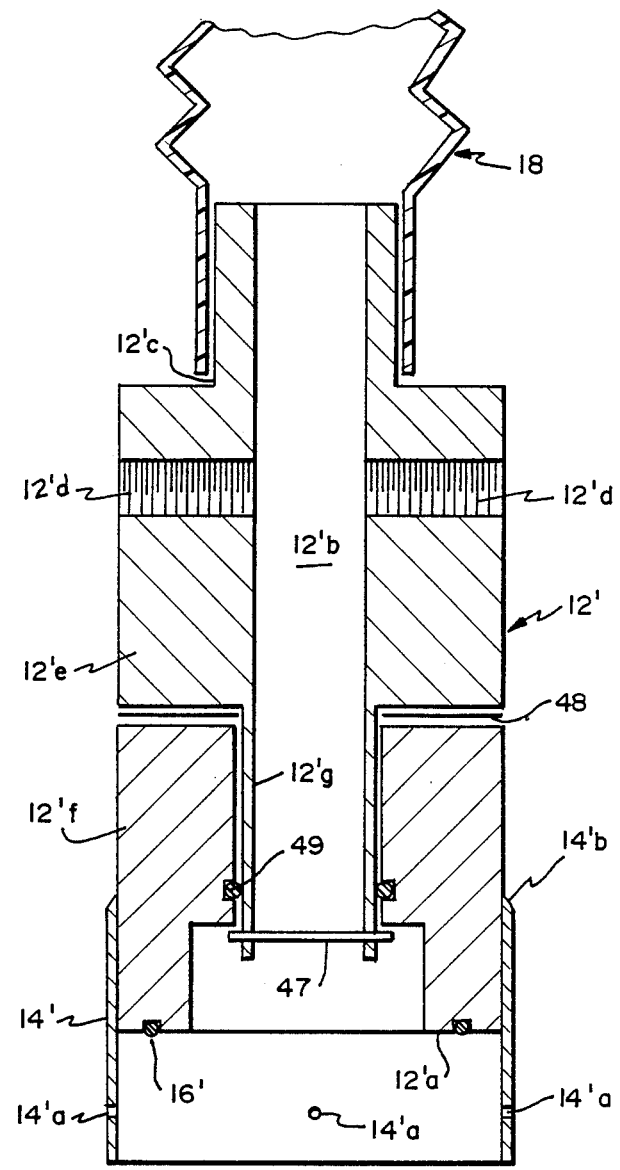
FIG. 3 illustrates a modified embodiment of a leakage recovery unit of the leakage protector in accordance with the present invention with only a portion of a bellows shown positioned thereon.

Thus, for situations where relative rotational movement between the casing mounted recovery unit 12 and the rod mounted bellows component 18 is required, such as in arrangements where the packing gland has to be rotated to adjust the packing, a leakage recovery unit of the type shown in FIG. 3 can be used. The recovery unit 12 of FIG. 3 is illustrated with parts that correspond to those of the FIG. 2 recovery unit being designated with like reference characters, but being distinguished by prime (') designations. The embodiments of FIGS. 2 and 3 are essentially the same in function and structure, except that the body of the recovery unit 12' is subdivided into upper and lower parts 12'e, 12'f, respectively, which are connected together in a manner which permits relative rotational displacement therebetween.

More particularly, the upper body part 12'e is provided with a tubular extension which is sized to pass with clearance through the lower body part 12'f and is secured in place with only nominal axial play relative to lower body part 12'f via a snap ring 47. Furthermore, in order to facilitate rotational sliding movement between the facing end surfaces of the parts 12'e, 12'f, a disk 48 of low friction material, such as polytetrafluorethylene, is position therebetween. Still further, to prevent leakage from escaping through the clearance gap between the extension of the upper part 12'e and the surrounding internal surface of lower part 12'f, an O-ring seal 49 can be mounted within an annular groove in the internal surface of lower part 12'f so as to be sealingly compressed against the facing external annular surface of the tubular extension 12'g of upper part 12'e. With such a swivel arrangement, the bellows component 18, vacuum fitting 30, vacuum line 40, and liquid level responsive shutoff switch 50 can remain stationary, while the packing gland attached to the bottom portion of the adaptor 14' is rotated to tighten the packing.

Figure 8:
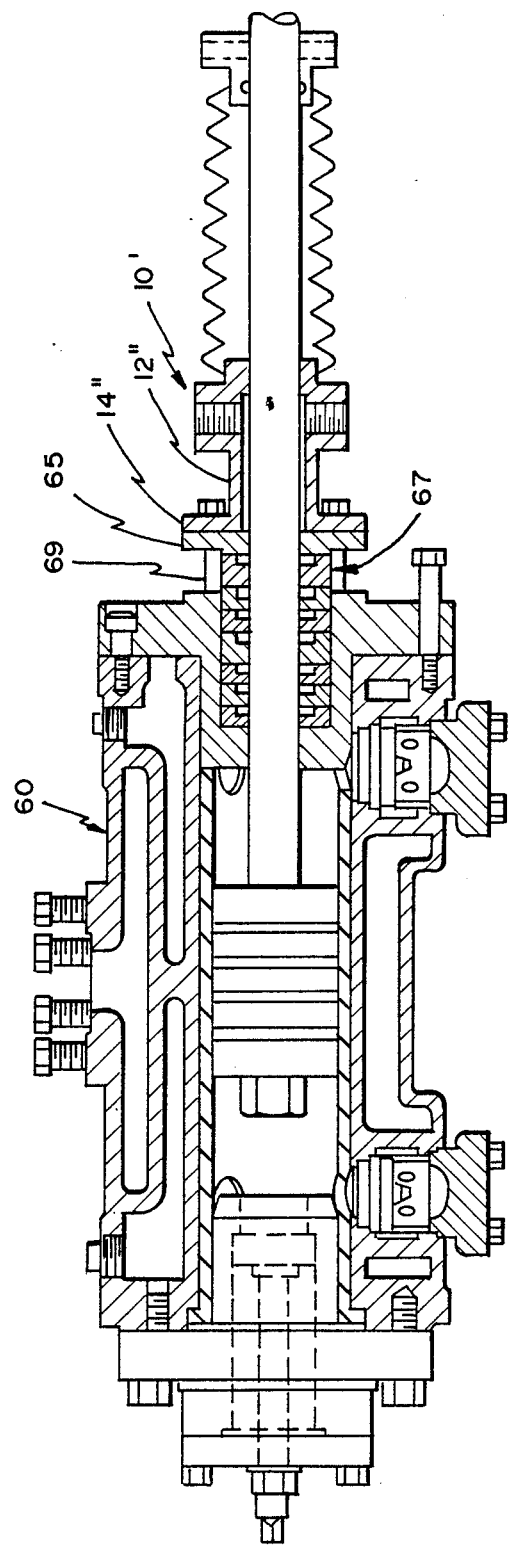
FIG. 8 is a cross-sectional view showing the protector in accordance with the present invention installed upon a compressor.

Still further, as shown in FIG. 8, a leakage protector 10', in accordance with the present invention, can be mounted to a compressor 60, instead of an oil well pumping unit. The protector 10' differs from that of FIGS. 2 and 3 only in that the adaptor 14" is formed as an integral part of the recovery unit 12' and is in the form of a radial flange having bolt holes through which it can be secured to the casing wall 65 of the packing gland 67 via the same bolts 69 normally used to secure the casing wall 65 closing the packing gland 67. The details of compressor 60 form no part of the present invention and, thus, will not be described, itself, the invention being applicable to any other type of reciprocating rod compressor as well.

Accordingly, the present invention should not be viewed as limited to the specific features of the various embodiments disclosed herein because numerous variations and other embodiments and applications of the invention will be apparent to those of ordinary skill in the art from the foregoing teachings. Instead, the present invention should be viewed as encompassing everything within the scope of the appended claims.

I claim: claims:

1. Leakage protector for reciprocating rod arrangements of the type having a reciprocating rod passing through a casing wall and a seal means for preventing leakage between the reciprocating rod and the casing wall, said leakage protector comprising:
(A) a leakage recovery unit having an adaptor means on a first end thereof for mounting of the recovery unit upon the casing wall in proximity to the seal means, said recovery unit having a hollow interior for enabling the reciprocating rod to pass therethrough with clearance when the leakage recovery unit is mounted upon the casing, and having a seal for preventing leakage between said first end of the recovery unit and the casing wall;
(B) a bellows component, said bellows component being coaxially mounted upon said leakage recovery unit in fixed relationship to an opposite end of the recovery unit from said adaptor means, the hollow interior of said recovery unit communicating with an interior space of the bellows component at a first end of the bellows while being sealed relative to the environment;
(C) a bellows mount having means for securing a second end of the bellows component to the reciprocating rod in a manner that is fixed and sealed relative to the rod; and
(D) a recovery fitting means for communicating said hollow interior of the leakage recovery unit with a vacuum recovery line, said fitting means having valve means for blocking flow from the hollow interior of the leakage recovery unit to the vacuum recovery line when the pressure within said hollow interior is below a predetermined positive pressure and for permitting flow from the hollow interior of the recovery unit to the vacuum recovery line when said pressure is above said predetermined positive pressure.

2. Leakage protector according to claim 1, further comprising safety means for producing a shutoff signal to terminate operation of the reciprocating rod arrangement when liquid collected in the hollow interior of the recovery unit reaches a predetermined level.

3. Leakage protector according to claim 1, wherein the adaptor of the leakage recovery unit is mounted in a sealed but relatively rotatable manner with respect to a body component of the recovery unit which defines the hollow interior space and carries said recovery fitting means.

4. Leakage protector according to claim 1, wherein said bellows component comprises a pair of bellows connected together via a floating bellows connector; wherein facing ends of the bellows are sealingly secured to opposite ends of the floating bellows connector; and Wherein the interior spaces of the bellows communicate with each other via a through passage for the reciprocating rod formed in said floating bellows connector.

5. Leakage protector according to claim 1, wherein said valve means is a spring-biased check valve.

6. In a reciprocating rod arrangement of the type having a reciprocating rod passing through a casing wall and a seal means for preventing leakage between the reciprocating rod and the casing wall, the improvement wherein a leakage protector is provided about said reciprocating rod in proximity to the seal means for preventing gases, vapors and liquids leaking past said seal means from reaching the surrounding environment; and wherein said leakage protector comprises:

(A) a leakage recovery unit having an adaptor means on one end thereof by which the recovery unit is mounted upon the casing wall in proximity to the seal means, said recovery unit having a hollow interior through which the reciprocating rod passes with clearance, and having a seal for preventing leakage between the adaptor means and the casing wall;

(B) a bellows component, said bellows component being coaxially mounted upon said leakage recovery unit in fixed relationship to an opposite end of the recovery unit from said adaptor means, the hollow interior of said recovery unit communicating with an interior space of the bellows component at a first end of the bellows while being sealed relative to the environment;

(C) a bellows mount securing a second end of the bellows component to the reciprocating rod in a manner that is fixed and sealed relative to the rod;

(D) a vacuum recovery line for withdrawing gases and fluids from the hollow interior space of the recovery unit; and (E) a recovery fitting means for communicating said hollow interior of the leakage recovery unit with said vacuum recovery line, said fitting means having valve means for blocking flow from the hollow interior of the leakage recovery unit to the vacuum recovery line when the pressure within said hollow interior is below a predetermined positive pressure and for permitting flow from the hollow interior of the recovery unit to the vacuum recovery line when said pressure is above said predetermined positive pressure.

7. Reciprocating rod arrangement according to claim 6, further comprising safety means for producing a shutoff signal to terminate operation of the reciprocating rod arrangement when liquid collected in the hollow interior of the recovery unit reaches a predetermined level.

8. Reciprocating rod arrangement according to claim 7, wherein said reciprocating rod arrangement is a well pump unit, wherein said reciprocating rod is a polish rod, and wherein said casing is a well head casing having a stuffing box within which said seal means is disposed.

9. Reciprocating rod arrangement according to claim 6, wherein said reciprocating rod arrangement is a well pump unit, wherein said reciprocating rod is a polish rod, and wherein said casing is a well head casing having a stuffing box within which said seal means is disposed.

10. Reciprocating rod arrangement according to claim 9, wherein the adaptor of the leakage recovery unit is mounted in a sealed but relatively rotatable manner with respect to a body component of the recovery unit which defines the hollow interior space and carries said recovery fitting means.

11. Reciprocating rod arrangement according to claim 9, wherein said bellows component comprises a pair of bellows connected together via a floating bellows connector; wherein facing ends of the bellows are sealingly secured to opposite ends of the floating bellows connector; and wherein the interior spaces of the bellows communicate with each other via a through passage for the reciprocating rod formed in said floating bellows connector.

12. Reciprocating rod arrangement according to claim 9, wherein said valve means is a spring-biased check valve.

13. Reciprocating rod arrangement according to claim 6, wherein said reciprocating rod arrangement is part of a compressor unit, said reciprocating rod being a piston rod of a compressor piston and said casing being part of a cylinder housing for the compressor piston.

14. Reciprocating rod arrangement according to claim 13, wherein the adaptor of the leakage recovery unit is mounted in a sealed but relatively rotatable manner with respect to a body component of the recovery unit which defines the hollow interior space and carries said recovery fitting means.

15. Reciprocating rod arrangement according to claim 13, wherein said bellows component comprises a pair of bellows connected together via a floating bellows connector; wherein facing ends of the bellows are sealingly secured to opposite ends of the floating bellows connector; and wherein the interior spaces of the bellows communicate with each other via a through passage for the reciprocating rod formed in said floating bellows connector.

16. Reciprocating rod arrangement according to claim 13, wherein said valve means is a spring-biased check valve.

17. Reciprocating rod arrangement according to claim 7, wherein the adaptor of the leakage recovery unit is mounted in a sealed but relatively rotatable manner with respect to a body component of the recovery unit which defines the hollow interior space and carries said recovery fitting means.

* * * * *